United States Patent
Okizaki et al.

(10) Patent No.: US 10,516,264 B2
(45) Date of Patent: Dec. 24, 2019

(54) PRINTING DEVICE AND METHOD FOR CONTROLLING POWER FROM THE PRINTING DEVICE TO AN EXTERNAL DEVICE

(71) Applicant: SEIKO EPSON CORPORATION, Tokyo (JP)

(72) Inventors: Naoya Okizaki, Matsumoto (JP); Tetsuo Osada, Okaya (JP); Kazuyuki Yokoyama, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 177 days.

(21) Appl. No.: 15/455,974

(22) Filed: Mar. 10, 2017

(65) Prior Publication Data

US 2017/0264093 A1    Sep. 14, 2017

(30) Foreign Application Priority Data

Mar. 11, 2016   (JP) .................. 2016-048813

(51) Int. Cl.

| | |
|---|---|
| H02J 1/14 | (2006.01) |
| G06F 1/26 | (2006.01) |
| G03G 15/00 | (2006.01) |
| G06F 1/3234 | (2019.01) |
| G07G 1/00 | (2006.01) |

(52) U.S. Cl.
CPC ............ *H02J 1/14* (2013.01); *G03G 15/5004* (2013.01); *G03G 15/80* (2013.01); *G06F 1/26* (2013.01); *G06F 1/266* (2013.01); *G06F 1/3284* (2013.01); *G07G 1/0018* (2013.01); *Y02D 10/159* (2018.01)

(58) Field of Classification Search
CPC ....... H02J 1/14; G03G 15/5004; G03G 15/80; G06F 1/26; G06F 1/266; G06F 1/3284; G07G 1/0018; Y02D 10/159
USPC .................................................. 713/300, 310
See application file for complete search history.

(56) References Cited

U.S. PATENT DOCUMENTS

| | | | | |
|---|---|---|---|---|
| 9,778,716 B2* | 10/2017 | Jimbo | ...................... | G06F 1/266 |
| 9,892,348 B2* | 2/2018 | Uno | .......................... | B41J 3/44 |
| 10,052,892 B2* | 8/2018 | Satake | ..................... | B41J 29/38 |
| 2003/0135664 A1* | 7/2003 | Hayashi | ............... | G06F 9/4411 |
| | | | | 719/321 |
| 2004/0187042 A1* | 9/2004 | Kawanabe | ............. | G06F 1/266 |
| | | | | 713/300 |

(Continued)

FOREIGN PATENT DOCUMENTS

| | | |
|---|---|---|
| JP | 2003-001901 A | 1/2003 |
| JP | 2005-012889 A | 1/2005 |

*Primary Examiner* — Ji H Bae
(74) *Attorney, Agent, or Firm* — Foley & Lardner LLP (57) ABSTRACT

Power can be supplied to a smart device without affecting control of a cash drawer. A printer 1 capable of connecting to a smart device 2 and a cash drawer 3 has a wireless communicator 16 for communicating with the smart device 2, a drawer kick connector 18 that connects to the drawer 3, a power circuit 14, and a controller 11. When a command instructing control of the drawer 3 is received from the smart device 2 by the wireless communicator 16, the controller 11 stops the supply of power from the power circuit 14 to the smart device 2; and when control of the drawer 3 ends, the controller 11 starts supplying power to the smart device 2.

9 Claims, 5 Drawing Sheets

(56) References Cited

U.S. PATENT DOCUMENTS

| | | | |
|---|---|---|---|
| 2010/0171627 A1* | 7/2010 | Takizawa | G07G 1/0027 340/665 |
| 2012/0127517 A1* | 5/2012 | Oh | G03G 15/5004 358/1.15 |
| 2015/0067374 A1* | 3/2015 | Kim | G06F 13/4072 713/324 |
| 2015/0264208 A1* | 9/2015 | Achiwa | H04N 1/00885 358/1.15 |
| 2016/0253646 A1* | 9/2016 | Shinmura | G06K 15/02 705/21 |

* cited by examiner

PRINTING DEVICE AND METHOD FOR CONTROLLING POWER FROM THE PRINTING DEVICE TO AN EXTERNAL DEVICE

This application claims priority under 35 U.S.C. § 119 to Japanese Patent Application No. 2016-048813 filed on Mar. 11, 2016, the entire disclosure of which is expressly incorporated by reference herein.

BACKGROUND

1. Technical Field

The present invention relates to a printing device, and a control method of a printing device.

2. Related Art

Technology for supplying power to an external device through a USB connector is known from the literature. See, for example, JP-A-2005-12889. JP-A-2005-12889 describes a host device monitoring the charging current of a first device and the consumption current of another device, and controlling the charging current supplied to the first device so that the sum of the charging current and the consumption current do not exceed a reference value.

When a printer connects as a host device described in JP-A-2005-12889 to a first external device and a second external device, the printer supplies power to the first external device and second external device based on the power supplied from an AC adapter, for example. However, depending on the power supplied to the first external device, supplying power sufficient to control the second external device may not be possible.

The invention is directed to solving this problem, and enables supplying power to a first external device without affecting control of the second external device.

SUMMARY

To achieve the foregoing objective, a printing device (printer) according to the invention is capable of connecting to a first external device and a second external device, and includes: a first communicator configured to communicate with the first external device; a power supply unit configured to supply power to the first external device; and a controller configured to stop supplying power from the power supply unit to the first external device when a command instructing control of the second external device is received by the first communicator from the first external device, and to start supplying power from the power supply unit to the first external device when execution of the command ends.

Because the supply of power from the power supply unit to the first external device stops when a command instructing control of the second external device is received, and supplying power from the power supply unit to the first external device starts when control of the second external device ends, power can be supplied to the first external device without affecting control of the second external device.

Preferably, the printing device also has a second communicator capable of connecting to a control device, and configured to communicate with the control device; and the controller is configured to stop supplying power from the power supply unit to the first external device when the command is received by the second communicator from the control device instead of from the first external device, and to start supplying power from the power supply unit to the first external device when execution of the command ends.

Because this configuration stops supplying power from the power supply unit to the first external device when the command is received from the control device, and starts supplying power from the power supply unit to the first external device when control of the second external device ends, power can be supplied to the first external device without affecting the operation of controlling the second external device even when the command instructing control of the second external device is received from a control device different from the first external device.

Further preferably in a printing device according to another aspect of the invention, the command instructs outputting a control signal to the second external device.

Because this configuration stops supplying power from the power supply unit to the first external device while outputting the control signal to the second external device, and starts supplying power from the power supply unit to the first external device when output of the control signal ends, the supply of power to the first external device can be controlled according to output of the control signal.

Further preferably in a printing device according to another aspect of the invention, the first external device is a mobile terminal capable of sending the command to the printing device.

This configuration enables supplying power to a mobile terminal without affecting a second external device.

Further preferably in a printing device according to another aspect of the invention, the second external device is a cash drawer.

This configuration enables supplying power to the first external device without affecting control of the cash drawer.

Further preferably in a printing device according to another aspect of the invention, the control device is a POS terminal; and the printing device is a device that prints receipts.

This configuration enables a printer that prints receipts to supply power to the first external device without affecting the second external device even when a command instructing an operation of the second external device is received from the POS terminal.

Further preferably in a printing device according to another aspect of the invention, the power supply unit supplies power for charging a battery of the first external device.

This configuration enables charging the battery of the first external device without affecting the second external device.

Another aspect of the invention is a control method of a printing device capable of connecting to a first external device and a second external device, and having a first communicator configured to communicate with the first external device, and a power supply unit that supplies power to the first external device, the control method including: stopping supplying power from the power supply unit to the first external device when a command instructing control of the second external device is received by the first communicator from the first external device; and starting supplying power from the power supply unit to the first external device when execution of the command ends.

Because the supply of power from the power supply unit to the first external device stops when a command instructing control of the second external device is received, and supplying power from the power supply unit to the first external device starts when control of the second external device ends, power can be supplied to the first external device without affecting control of the second external device.

Other objects and attainments together with a fuller understanding of the invention will become apparent and appreciated by referring to the following description and claims taken in conjunction with the accompanying drawings.

DESCRIPTION OF EMBODIMENTS

Embodiment 1

Figure 1:
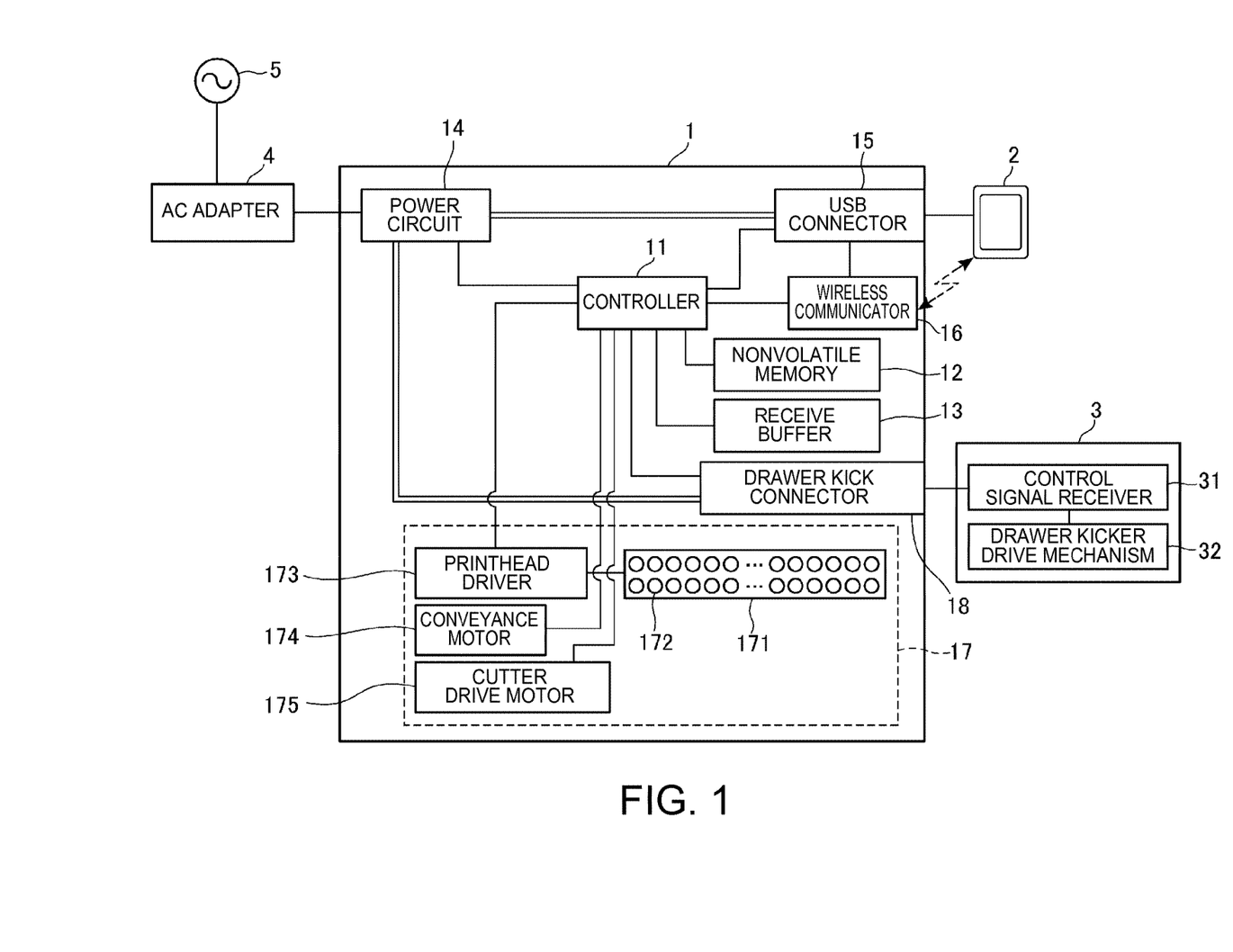
FIG. 1 is a function block diagram of a printer according to a first embodiment of the invention.

FIG. 1 is a function block diagram of a printer 1 (printing device) according to a first embodiment of the invention.

The printer 1 is a device that prints text and images, for example, on recording media based on data input from a connected external device. In this embodiment of the invention, the printer 1 connects to a smart device 2 (first external device; mobile terminal), and based on data input from the smart device 2 prints text, images or other content on recording media. The printer 1 operates using power supplied from an AC adapter 4 that connects to a commercial power source 5. The printer 1 internally stores thermal roll paper (not shown in the figure) as the recording medium, and prints text and images by applying heat to the recording surface of the thermal roll paper by means of a thermal line head 171 having multiple heat elements 172 as described below.

The smart device 2 is a smartphone, tablet, or other mobile terminal that is typically held by the user. The smart device 2 has a communicator (not shown in the figure) for communicating data according to a specific communication protocol, and communicates with the printer 1 through the communicator. The smart device 2 has a battery, and operates by power stored in the battery. The battery used in the smart device 2 is a lithium ion battery or other type of storage battery, for example. The smart device 2 uses the 5-V power supplied from the USB (Universal Serial Bus) connector 15 described below to charge the battery.

Triggered by a user command, for example, the smart device 2 can send control-related commands and printing-related commands to the printer 1. When commands are sent from the smart device 2, the printer 1 stores the commands in a receive buffer 13. Control-related commands include, for example, commands specifying format settings, commands specifying requests for information about the printer 1 status, and commands specifying controlling an external device that connects to the printer 1. In this example, the smart device 2 sends, as a control-related command, a command specifying controlling a drawer (second external device) described below. Examples of printing-related commands include commands instructing printing, commands instructing a line feed, and commands instructing cutting the recording medium. More specifically, the printing-related commands are commands that instruct driving a thermal line head 171, conveyance motor 174, and cutter drive motor 175 described below.

To cause the printer 1 to print, the smart device 2 generates print data including the text, images, or other content the printer 1 is to print when triggered by a user command, for example. The smart device 2 then sends commands including the generated print data according to a specific communication protocol to the printer 1. The printer 1 then executes the commands and prints the text and images on the recording medium based on the print data.

The AC adapter 4 is connected to a commercial power source 5 through a cable, rectifies, smoothes, and voltage converts the power supplied from the 100-VAC commercial power source 5, for example, and supplies 24-VDC power to the printer 1 through a cable. The AC adapter 4 is configured to disconnectably connect with the printer 1 through the connector.

As shown in FIG. 1, the printer 1 has a controller 11, nonvolatile memory 12, receive buffer 13, power circuit 14 (power supply unit), USB connector 15, wireless communicator 16 (first communicator), print unit 17 (print mechanism 17), and drawer kick connector 18.

The controller 11 has a CPU (central processing unit), ROM (read-only memory), RAM (random access memory), and other peripheral circuits not shown, and controls the printer 1.

The nonvolatile memory 12 is EEPROM (Electrically Erasable Programmable Read-Only Memory), flash memory, or other type of semiconductor memory device, or a hard disk drive or other type of storage device, and nonvolatilely stores data rewritably.

The receive buffer 13 is a temporary storage device, such as RAM or other type of semiconductor memory device. The receive buffer 13 stores commands received from external devices as controlled by the controller 11. In this example, the receive buffer 13 stores commands received from the smart device 2 through the wireless communicator 16.

The power circuit 14 connects to an AC adapter 4, and supplies power to other parts of the printer 1 based on the power supplied from the AC adapter 4. The power circuit 14 also supplies power for charging the battery of the smart device 2 through a USB connector.

The USB connector 15 is exposed to the outside of the printer 1, and has, for example, two power pins (VBUS, GND) and two data pins (D+, D−). The USB connector 15 supplies power to a connected external device through the two power pins as controlled by the controller 11. For convenience below, the voltage supplied from the USB connector 15 to the external device is referred to as VBUS. The voltage VBUS of the power the USB connector 15 generally supplies to the external device is 5 V. In this example, the smart device 2 connects through a USB cable to the USB connector 15. The power circuit 14 also supplies power for charging the battery of the smart device 2 through the USB connector 15 to the smart device 2 connected to the USB connector 15. The USB cable is a cable conforming to the USB standard.

The USB connector 15 also detects connection of an external device. The detection signal is output to the controller 11.

The wireless communicator 16 exchanges data with the external device according to a specific wireless communication protocol such as Wi-Fi® or Bluetooth®. In this example, the wireless communicator 16 communicates with the smart device 2.

The print unit 17 prints based on the print data received from the external device as controlled by the controller 11. In this example, the print unit 17 prints based on print data received from the smart device 2. The print unit 17 includes a thermal line head 171, printhead driver 173, conveyance motor 174, and cutter drive motor 175.

The thermal line head 171 has numerous heat elements 172 arrayed in a line perpendicular to the conveyance direction of the thermal roll paper, and prints text and images by energizing heat elements 172 to apply heat to the printing surface of the thermal roll paper.

The printhead driver 173 controls energizing heat elements 172 of the thermal line head 171 as controlled by the controller 11.

The conveyance motor 174 causes the conveyance rollers (not shown in the figure) to turn and conveys the thermal roll paper as controlled by the controller 11.

The cutter drive motor 175, as controlled by the controller 11, drives a movable knife (not shown in the figure) to slide against a fixed knife (not shown in the figure) to cut the thermal roll paper.

The drawer kick connector 18 is a Registered Jack (RJ) connector, and connects to the drawer 3. The drawer kick connector 18 is exposed to the outside of the printer 1, and in this example has six pins: one (referred to below as the power supply pin) for supplying power to the drawer 3; two (referred to below as control signal output pins) for outputting drawer control signals (control signal) controlling the drawer 3; two connected to ground; and one (referred to below as signal input pins) for inputting signals to the printer 1. The drawer kick connector 18 supplies 24-V power through the power supply pin. The drawer kick connector 18 also outputs drawer control signals to the drawer 3 from either one of the two control signal output pins. A signal indicating the state of the drawer 3 is also input to the the drawer kick connector 18 from the drawer 3 through the signal input pins.

As shown in FIG. 1, a drawer 3 is connected to the drawer kick connector 18 through a cable conforming to the standard of the drawer kick connector 18.

The drawer 3 is a device having a tray for holding money, for example, and a mechanism for kicking the tray out from a locked position in the drawer 3. As shown in FIG. 1, the drawer 3 has a control signal receiver 31 and a drawer kicker drive mechanism 32.

A control signal receiver 31 receives drawer control signals the controller 11 of the printer 1 sends through the drawer kick connector 18. As described above, a drawer control signal is a signal controlling the drawer 3. Controlling the drawer 3 in this example means changing the state of the drawer 3 so that the tray of the drawer 3 is kicked out from the drawer 3 (also referred to below as opening the drawer 3). The drawer control signal is therefore a signal for changing the drawer 3 to the open state (that is, opening the drawer 3). When a drawer control signal is received, the control signal receiver 31 generates and outputs data instructing opening the tray to the drawer kicker drive mechanism 32.

The drawer kicker drive mechanism 32 has a lock mechanism for locking or unlocking the cash tray in the drawer 3, a drawer kicker for moving the tray out in a specific direction, and a control circuit for controlling the lock mechanism and the drawer kicker. When data instructing opening the drawer is input from the control signal receiver 31, the control circuit of the drawer kicker drive mechanism 32 unlocks the lock mechanism. Next, the control circuit of the drawer kicker drive mechanism 32 controls the drawer kicker to move the tray in the specific direction, thereby opening the drawer 3. When the tray is then stored in the drawer 3 by a user operation, the drawer kicker drive mechanism 32 operates the lock mechanism to lock the tray in the drawer 3.

The smart device 2 in this example is used with the printer 1 in a POS (point-of-sale) system. A POS system is a system commonly used in retail sales in shopping centers, department stores, convenience stores, and sales carts on trains, for example, as well as in restaurants, coffee shops, bars, and other food service businesses. A POS system has functions for processing sales transactions appropriately to the product or service purchased by a customer, and printing sales receipts.

A POS system is described below using the example of a POS system used in a restaurant. A smart device 2 is assigned to each waiter, who carries the smart device 2 while moving about the restaurant. When the waiter needs to print a receipt, she operates the smart device 2 to send print data to a printer 1 installed in the restaurant, causing the printer 1 to print based on the print data. As a result, the printer 1 prints a receipt in response to operation of the smart device 2.

Because the user carries the smart device 2 around, the battery of the smart device 2 must be periodically recharged.

In this example, the printer 1 outputs a 5-V power supply to the VBUS pin of the smart device 2 connected through the USB connector 15. The smart device 2 then charges the battery using the power supplied from the printer 1.

However, when an external device other than the smart device 2 connected to the printer 1 operates, the power required by the printer 1 may exceed the capacity of the AC adapter 4 depending upon the power supplied to the smart device 2. The power required by the printer 1 includes the power supplied to the connected external device. More specifically, if the power required by the printer 1 exceeds the capacity of the AC adapter 4, the printer 1 may not be able to supply to the external device the power required for the external device to operate. This has the effect of the external device being unable to operate.

When opening the drawer 3 in this example, depending on the power supplied to the smart device 2, the sum of the power supplied to the smart device 2 and the power supplied to the drawer 3 may exceed the capacity of the AC adapter 4, and supplying to the drawer 3 the power required to control the drawer 3 may not be possible. In this event, the printer 1 cannot open the drawer 3 due to an insufficient power supply to the drawer 3. As described above, the drawer 3 has a cash tray. When the drawer 3 is installed at the checkout counter and the checkout clerk processes a customer transaction, the checkout clerk may execute a process involving opening the drawer 3 and making change for the customer. If the power supply to the drawer 3 is insufficient when the checkout clerk executes this transaction process, the drawer 3 may not open and transaction processing may be affected.

The printer 1 according to this embodiment therefore operates as described below.

Figure 2:
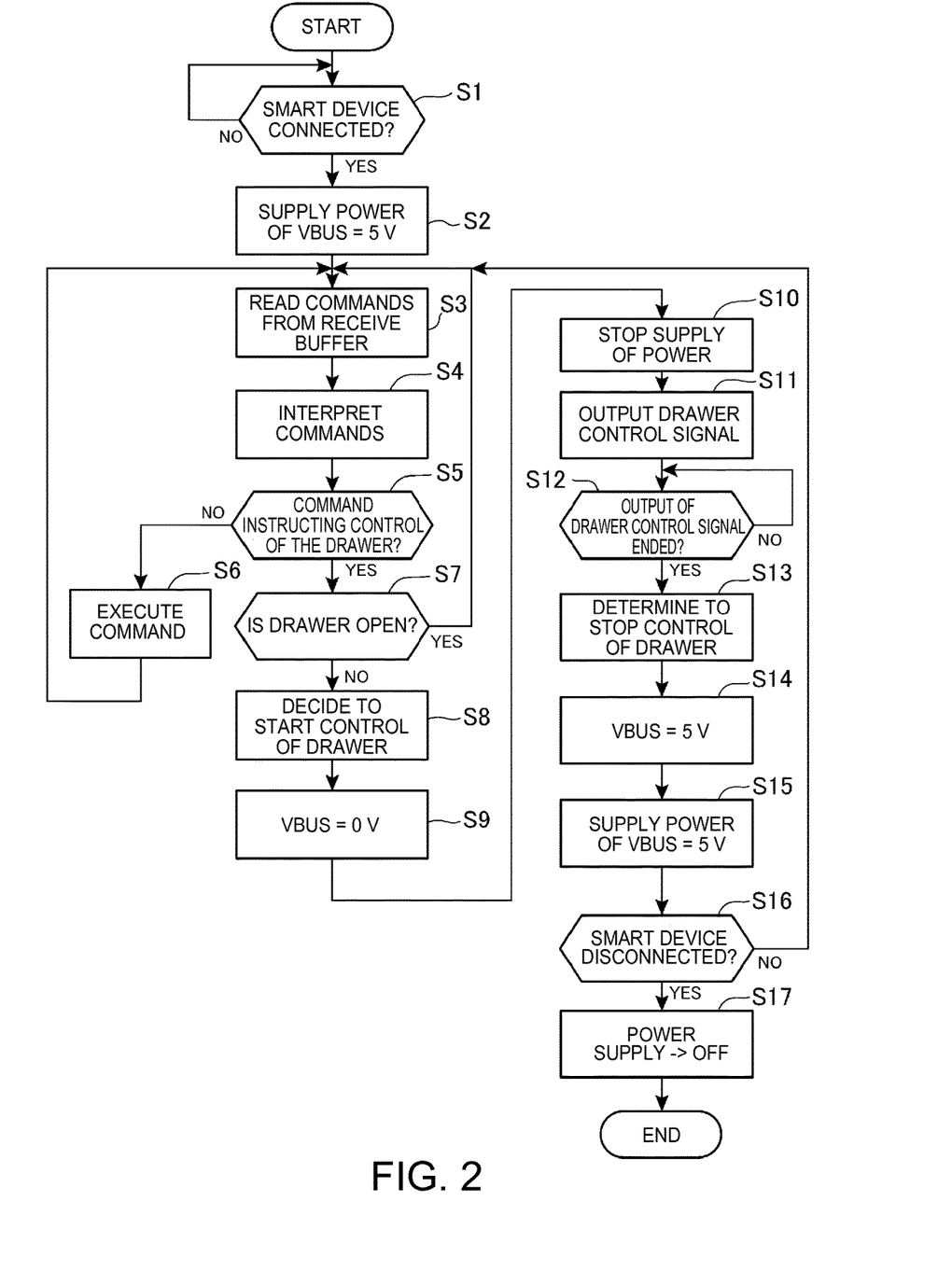
FIG. 2 is a flow chart describing control of the printer.

FIG. 2 is a flow chart of the operation of the printer 1 according to this embodiment.

The controller 11 of the printer 1, based on the detection signal output from the USB connector 15, determines whether or not a smart device 2 is connected (step S1). If the controller 11 determines a smart device 2 is connected (step S1: YES), the power circuit 14 outputs a 5-V VBUS power supply through the USB connector 15 to the smart device 2 (step S2). The smart device 2 then charges the battery using the supplied power.

Next, the controller 11 reads the commands received form the smart device 2 from the receive buffer 13 (step S3), and interprets the read commands (step S4). If the controller 11 determines as a result of interpreting the commands that the read command is not a command instructing controlling the drawer 3 (step S5: NO), it executes the command (step S6). For example, if the read command is a status request command, the controller 11 outputs to the smart device 2 information indicating the status of the printer 1.

However, if the read command is a command instructing controlling the drawer 3 (step S5: YES), the controller 11 determines whether or not the drawer 3 is open (step S7). The controller 11 determines if the drawer 3 is open based on a signal input from the drawer 3 indicating the state of the drawer 3. For example, if a signal indicating a High level voltage is input from the drawer 3 to the signal input pins of the drawer kick connector 18, the controller 11 determines the drawer 3 is open. However, if a signal indicating a Low level voltage is input from the drawer 3 to the signal input pins of the drawer kick connector 18, the controller 11 determines the drawer 3 is not open. If the drawer 3 is not open, the cash tray is not kicked out from the drawer 3, and the tray is locked inside the drawer 3.

If the drawer 3 is determined to be open (step S7: YES), the controller 11 returns to step S3. If the drawer 3 is not open (step S7: NO), the controller 11 determines to start control of the drawer (step S8).

If the controller 11 determines to start controlling the drawer 3, it generates a signal to control VBUS so that the VBUS voltage goes from 5 V to 0 V, and sends the signal to the power circuit 14 to change the voltage (step S9). When this signal is received, the power circuit 14 changes the VBUS voltage from 5 V to 0 V. An example of a method of changing the VBUS voltage is described next.

In this example the power circuit 14 has a DC/DC converter that converts a DC voltage to a DC voltage of a different voltage. The power circuit 14 uses the DC/DC converter to convert the 24-V input from the AC adapter 4 to the 5-V VBUS voltage output to the USB connector 15. The DC/DC converter has a reference voltage, and controls the output voltage by comparing the output voltage with the reference voltage. In other words, based on the signal input from the controller 11, the power circuit 14 changes the reference voltage of the DC/DC converter to change the output voltage.

The method whereby the power circuit 14 changes the VBUS voltage is not limited to this example.

Referring again to the flow chart in FIG. 2, the controller 11 controls the power circuit 14 to change the VBUS voltage from 5-V to 0 V and stop supplying voltage to the smart device 2 (step S10), and outputs the drawer control signal through the drawer kick connector 18 to the drawer 3 (step S11).

Next, the controller 11 determines whether or not to stop outputting the drawer control signal (step S12). If stopping output of the drawer control signal is determined (step S12: YES), the controller 11 determines to stop control of the drawer 3 (step S13). Next, the controller 11 generates a VBUS control signal to change the VBUS voltage from 0 V to 5 V, and sends the signal to the power circuit 14 to change the VBUS voltage to 5 V (step S14). Next, the controller 11 starts supplying power to the smart device 2 (step S15).

Operation of the controller 11 when stopping and starting supplying power to the smart device 2 is described in further detail next.

Figure 3:
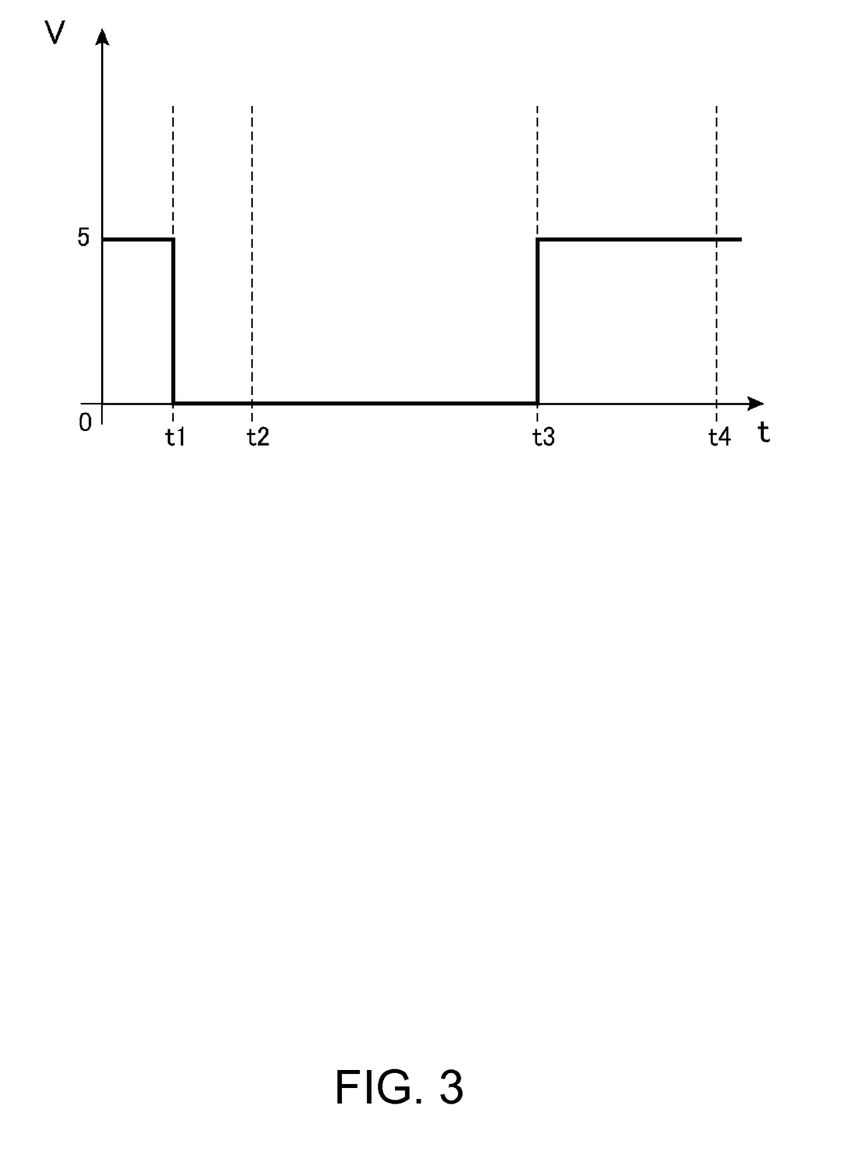
FIG. 3 shows an example of the change in voltage supplied to a smart device.

FIG. 3 is a graph showing the change in the voltage the printer 1 supplies to the smart device 2. The VBUS voltage is on the Y-axis, and time on the X-axis, in FIG. 3.

Figure 4:
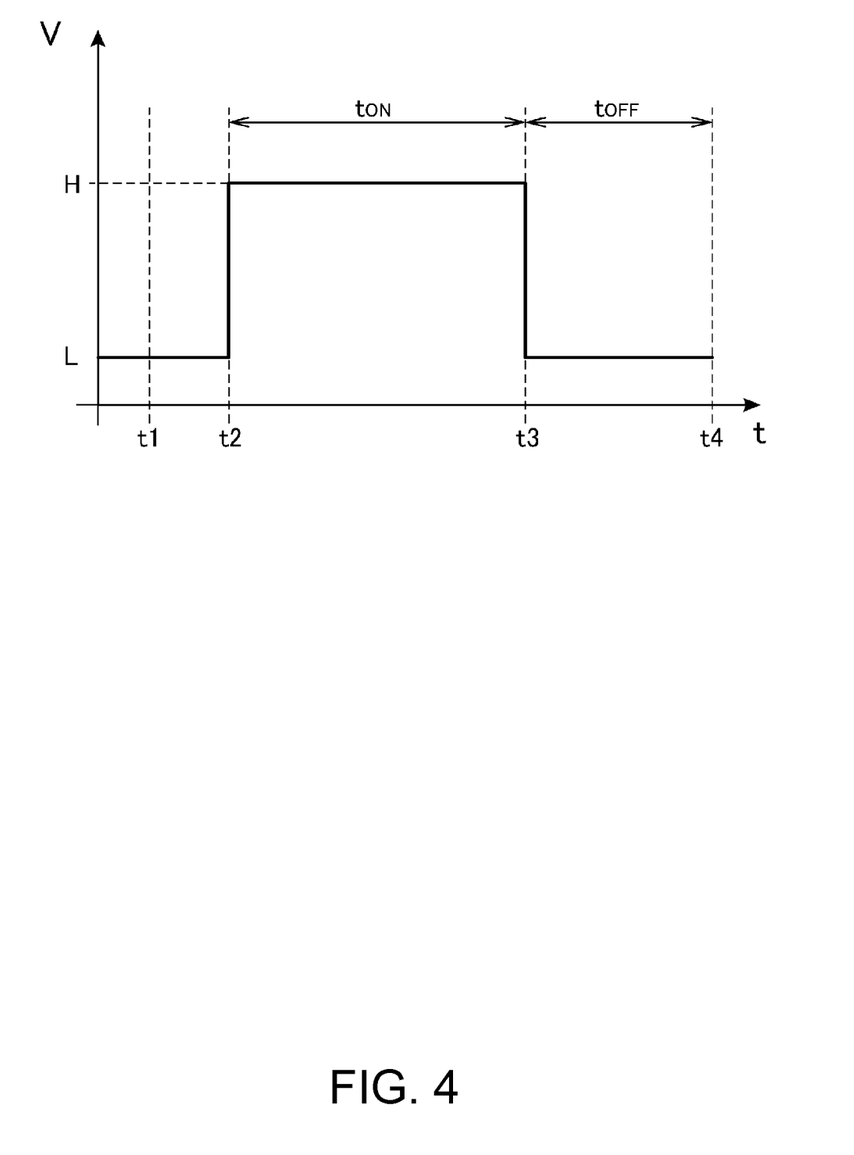
FIG. 4 shows an example of a drawer control signal.

FIG. 4 shows an example of the drawer control signal. In FIG. 4, signal voltage is on the Y-axis and time is on the X-axis.

In FIG. 4, tON is the period in which the controller 11 outputs a High level voltage through the drawer kick connector 18 to the drawer 3, and tOFF is the period after period tON in which the controller 11 outputs a Low level voltage through the drawer kick connector 18 to the drawer 3. Both tON and tOFF are parameters contained in the command instructing control of the drawer 3, and are set as desired by the user.

Times t1 to t4 in FIG. 3 are the same as times t1 to t4 in FIG. 4. More specifically, time t1 in FIG. 3 is the same as time t1 in FIG. 4; time t2 in FIG. 3 is the same as time t2 in FIG. 4; time t3 in FIG. 3 is the same as time t3 in FIG. 4; and time t4 in FIG. 3 is the same as time t4 in FIG. 4.

At time t1, the controller 11 determines the command received from the smart device 2 is a command instructing control of the drawer 3 and that the drawer 3 is not open, determines to start control of the drawer 3, and as shown in FIG. 3 changes VBUS from 5 V to 0 V (step S9). More specifically, at time t1 in FIG. 3, the controller 11 stops supplying power from the power circuit 14 to the smart device 2 (step S10).

As shown in FIG. 4, at time t2, the controller 11 outputs a High level voltage through the drawer kick connector 18 to the drawer 3 (step S11). Outputting a High level voltage to the drawer 3 at this time is equivalent to outputting a drawer control signal.

When the drawer 3 receives the drawer control signal through the control signal receiver 31, the cash tray is moved out in the specific direction from the drawer 3 by the drawer kicker drive mechanism 32. In other words, the drawer 3 opens. After time t2, the controller 11 outputs a High level voltage to the drawer 3 for period tON. In other words, the controller 11 outputs a drawer control signal to the drawer 3 for period tON after time t2.

The controller 11 thus stops supplying power to the smart device 2 when it receives a command instructing control of the drawer 3 from the smart device 2, and starts control of the drawer 3. As a result, the controller 11 can suppress the occurrence of such problems as being unable to supply to the drawer 3 enough power to open the drawer 3. More specifically, the controller 11 can suppress the problem of the drawer 3 being unable to transition to the open state when a command instructing control of the drawer 3 is received. More particularly, as shown in FIG. 4, after stopping supplying power to the smart device 2, the controller 11 outputs the drawer control signal to the drawer 3. As a result, the controller 11 can reliably prevent being unable to supply to the drawer 3 the power required to open the drawer 3.

When the drawer 3 is, for example, located at a checkout counter as described above, and a customer comes to the counter to make a transaction, the checkout clerk at the checkout counter executes a transaction-related process of opening the drawer 3 and making change for the customer. Because the controller 11 of the printer 1 stops supplying power to the smart device 2 when opening the drawer 3, problems such as the drawer 3 not opening can be suppressed and interrupting the transaction process can be prevented.

Note that the timing for outputting the drawer control signal to the drawer 3 is not limited to after stopping supplying power to the smart device 2. For example, the drawer control signal output timing, and the timing for stopping supplying power to the smart device 2, may be the same. In other words, in FIG. 3 and FIG. 4, time t1 and time t2 may be the same. This configuration also suppresses problems such as the drawer 3 being unable to open because the power supplied to the drawer 3 is insufficient.

As shown in FIG. 4, when tON has past and time t3 is reached, the controller 11 outputs a Low level voltage to the drawer 3. In this example, outputting a Low level voltage is equivalent to not outputting a drawer control signal.

When tON has past, the controller 11 determines to stop outputting the drawer control signal to open the drawer 3 (step S12: YES), and determines to stop control of the drawer 3 (step S13). As shown in FIG. 3, at time t3 the controller 11 then changes VBUS from 0 V to 5 V (step S14), and starts supplying to the smart device 2 (step S15).

Because supplying power to the smart device 2 thus starts when control of the drawer 3 ends, the controller 11 can start supplying power to the smart device 2 without affecting opening the drawer 3.

Note that the timing for starting supplying power to the smart device 2 is not limited to after period tON passes. As described above, the command that instructs control of the drawer 3 is a command including the tOFF parameter. Period tOFF is the period the Low level voltage is output to the drawer 3 after tON passes. The controller 11 may therefore supply power to the smart device 2 after period tON has past and then period tOFF has also past. For example, when tOFF has past at time t4 in FIG. 4, the controller 11 may change VBUS from 0 V to 5 V at time t4, and start supplying power to the smart device 2. This has the same effect as described above.

Returning to FIG. 2, the controller 11, based on a detection signal from the USB connector 15, determines if the smart device 2 was disconnected from the printer 1 (step S16). If the smart device 2 was not disconnected (step S16: NO), the controller 11 continues supplying power to the smart device 2 by the power circuit 14. If the smart device 2 was disconnected (step S16: YES), the controller 11 stops the power supply to the smart device 2 (step S17).

As described above, the printer 1 can connect to a smart device 2 (first external device; mobile terminal) and a drawer 3 (second external device). The printer 1 has a wireless communicator 16 (first communicator) that communicates with the smart device 2; a drawer kick connector 18 to which a drawer 3 connects; a power circuit 14 (power supply unit); and a controller 11 that stops supplying power from the power circuit 14 to the smart device 2 when a command instructing control of the drawer 3 is received from the smart device 2, and starts supplying power to the smart device 2 when control of the drawer 3 ends.

As a result, the supply of power from the power circuit 14 to the smart device 2 stops when a command instructing control of the drawer 3 is received, the supply of power from the power circuit 14 to the smart device 2 starts when control of the drawer 3 ends, and power can therefore be supplied to the smart device 2 without affecting control of the drawer 3. Furthermore, because power can be supplied to the smart device 2 without affecting control of the drawer 3, there is no need to increase the capacity of the AC adapter 4 that supplies power to a printer 1 to which multiple external devices can connect, and increasing the size of the AC adapter 4 as a result of increasing the capacity of the AC adapter 4 can be suppressed.

Furthermore, the supply of power to the smart device 2 stops while a drawer control signal (control signal) is output to the drawer 3 based on a parameter contained in the command received from the smart device 2, and supply of power to the smart device 2 starts when output of the drawer control signal ends.

As a result, because the supply of power to the smart device 2 stops while a drawer control signal is output to the drawer 3, and supply of power to the smart device 2 starts when output of the drawer control signal ends, supplying power to the smart device 2 can be controlled appropriately based on output of the drawer control signal.

Furthermore, the power circuit 14 supplies power for charging the battery of the smart device 2.

As a result, the battery of the smart device 2 can be charged without affecting operation of the drawer 3.

Embodiment 2

A second embodiment of the invention is described next.

Figure 5:
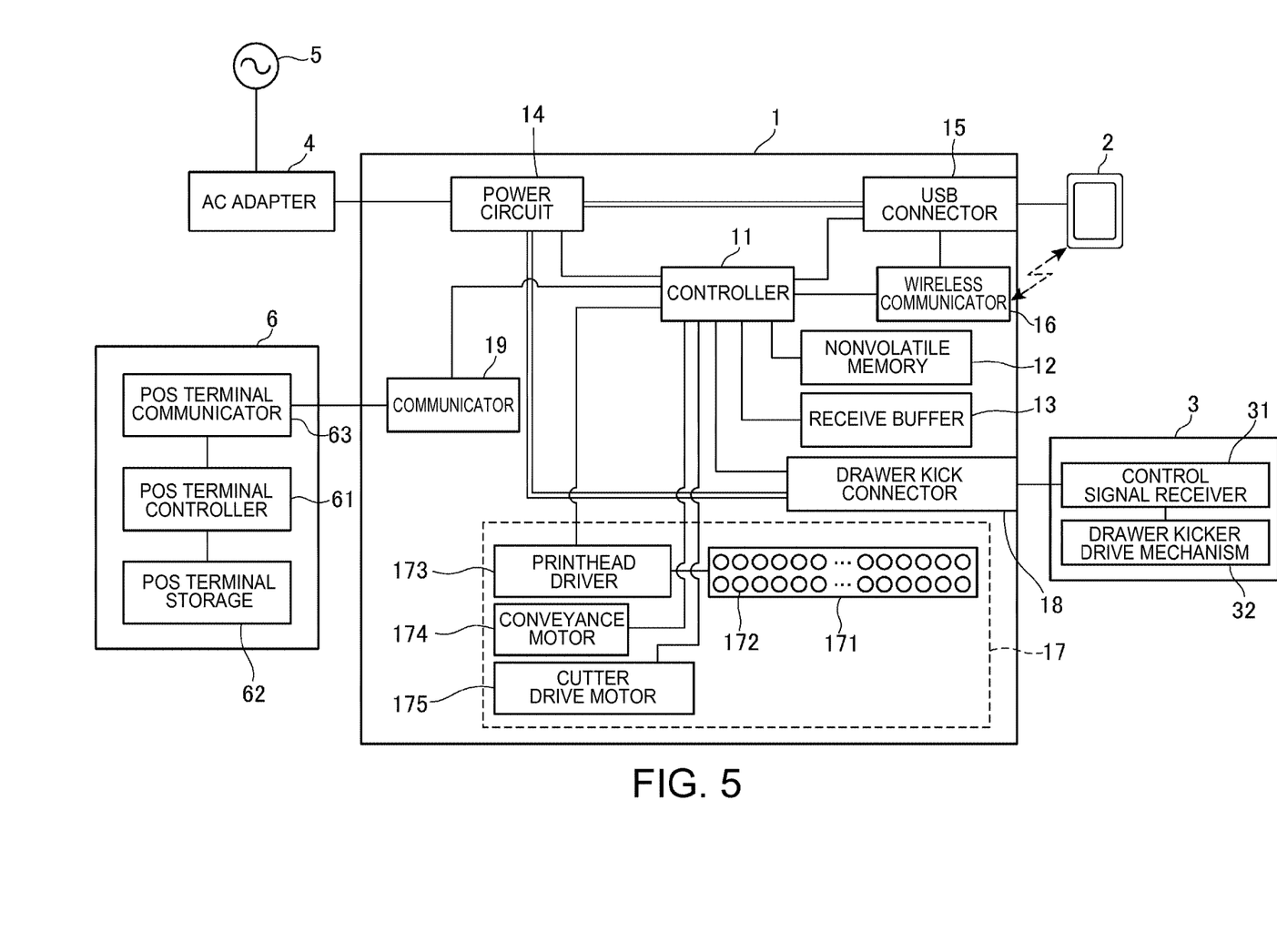
FIG. 5 is a function block diagram of a printer according to a second embodiment of the invention.

FIG. 5 illustrates the configuration of a printer 1A according to the second embodiment of the invention. Like aspects of the configuration of this embodiment and the printer 1 according to the first embodiment of the invention are identified by like reference numerals, and further description thereof is omitted or abbreviated.

As will be understood by comparison with the printer 1 of the first embodiment, the printer 1A of the second embodiment differs by having a communicator 19 (second communicator). This communicator 19 communicates with a POS terminal 6 (control device) according to a specific communication protocol.

The POS terminal 6 is a host computer or other control device that controls the printer 1A. More specifically, the POS terminal 6 executes a process related to transactions made at the checkout counter, controls the printer 1A based on the transaction process, and causes the printer 1A to print receipts. Similarly to the smart device 2 described above, the POS terminal 6 sends a command instructing control of the drawer 3 to the printer 1A during the transaction process to open the drawer 3.

As shown in FIG. 5, the POS terminal 6 has a POS terminal controller 61, POS terminal storage 62, and POS terminal communicator 63.

The POS terminal controller 61 has a CPU, ROM, RAM, and other peripheral circuits not shown, and controls parts of the POS terminal 6.

The POS terminal storage 62 has nonvolatile memory such as a hard disk drive or EEPROM device not shown, and nonvolatilely stores data.

The POS terminal communicator 63 communicates with the printer 1A according to a specific communication protocol as controlled by the POS terminal controller 61.

In the configuration shown in FIG. 5, the controller 11 operates in the same way as described above even when the POS terminal 6, instead of the smart device 2, sends a command instructing control of the drawer 3 to the printer 1A. More specifically, the controller 11 reads commands received from the POS terminal 6 from the receive buffer 13. Next, if the read command is a command instructing control of the drawer 3, the controller 11 stops supplying power to the smart device 2 and opens the drawer 3. When control of the drawer 3 ends, the controller 11 starts supplying power to the smart device 2. As a result, power can be supplied to the smart device 2 without affecting control of the drawer 3.

As described above, the printer 1A according to this embodiment can connect to a POS terminal 6 (control device). The printer 1A also has a communicator 19 (second communicator) for communicating with the POS terminal 6. When a command instructing control of the drawer 3 is received by the communicator 19 from the POS terminal 6 instead of the smart device 2, the controller 11 stops the supply of power from the power circuit 14 to the smart device 2, and when control of the drawer 3 ends, starts supplying power to the smart device 2.

As a result, because the controller 11 stops the supply of power to the smart device 2 when a command is received from the POS terminal 6, and starts supplying power to the smart device 2 when control of the drawer 3 ends, power can be supplied to the smart device 2 without affecting control of the drawer 3 even when a command instructing control of the drawer 3 is received from the POS terminal 6 instead of the smart device 2.

It will be obvious that the invention is not limited to the foregoing embodiments, which can be varied and adapted in many ways without departing from the scope of the invention.

For example, the first embodiment above describes a configuration in which the smart device 2 and the wireless communicator 16 of the printer 1 communicate, and the wireless communicator 16 receives commands sent from the smart device 2. However, the invention is not so limited, and commands sent from the smart device 2 may be received through the USB connector 15. In this configuration, the printer 1 has a receiver for receiving commands through the USB connector 15.

The foregoing embodiments further describe configurations in which the supply of power to the smart device 2 is started and stopped by changing the voltage applied to the VBUS pin. However, the method of starting and stopping the supply of power to the smart device 2 is not limited to changing the VBUS voltage.

The process units in FIG. 2 divide the main process content for ease of understanding the process of the printer 1, but the invention is not limited to this method and naming of the process unit segments. The process of the printer 1 may be further divided into more process units according to the process content. A single process unit may also be segmented to include multiple processes.

The function units shown in FIG. 1 and FIG. 5 illustrate desirable functional configurations, and the specific configuration of the invention is not limited thereto. More specifically, hardware components corresponding individually to each function unit are not necessarily required, and configurations in which a single processor embodies the functions of multiple function units by executing a specific program or programs are obviously conceivable. Furthermore, some functions embodied by software in the embodiments may be embodied by hardware, and some functions embodied by hardware in the embodiments may be embodied by software. The specific detailed configurations of the printer 1, 1A, drawer 3, POS terminal 6, and other parts can also be varied as desired without departing from the scope of the invention.

Furthermore, the printer 1, 1A in the foregoing embodiments is described as a printer with a thermal line head 171, that is, a thermal printer, but the invention is not so limited. For example, the printer may be an inkjet printer, dot impact printer, laser printer, or other type of printer.

What is claimed is:

1. A printing device configured to connect to a first external device and a second external device, and comprising:
a power circuit configured to supply power to the first external device; and
a controller comprising a processor and memory, the processor being configured to stop supplying power from the power circuit to the first external device when a command instructing control of the second external device is received from the first external device, and to start supplying power from the power circuit to the first external device when execution of the command ends.

2. The printing device described in claim 1, wherein:
the printing device is configured to communicate with a control device, and
the processor is configured to stop supplying power from the power circuit to the first external device when a command instructing control of the second external device is received from the control device, and to start supplying power from the power circuit to the first external device when execution of the command received from the control device ends.

3. The printing device described in claim 1, wherein:
the command is a command instructing output of a control signal to the second external device.

4. The printing device described in claim 1, wherein:
the first external device is a mobile terminal configured to send the command to the printing device.

5. The printing device described in claim 1, wherein:
the second external device is a cash drawer.

6. The printing device described in claim 2, wherein:
the control device is a POS terminal; and
the printing device is a device that prints receipts.

7. The printing device described in claim 1, wherein:
the power circuit supplies power for charging a battery of the first external device.

8. A method of controlling a printing device configured to connect to a first external device and a second external device, and having a power circuit configured to supply power to the first external device, the control method comprising:
stopping supplying power from the power circuit to the first external device when a command instructing control of the second external device is received from the first external device; and
starting supplying power from the power circuit to the first external device when execution of the command ends.

9. A printing device configured to connect to a first external device and a second external device, and to communicate with a control device, the printing device comprising:
a power circuit configured to supply power to the first external device; and
a controller comprising a processor and memory, the processor being configured to stop supplying power from the power circuit to the first external device when a command instructing control of the second external device is received from the control device, and to start supplying power from the power circuit to the first external device when execution of the command ends.

* * * * *